(12) United States Patent
Chuang

(10) Patent No.: US 7,717,577 B2
(45) Date of Patent: May 18, 2010

(54) REARVIEW MIRROR DEVICE WITH WIDE VIEWING ANGLE

(75) Inventor: Shu-Fen Chuang, Lugang Township, Changhua County (TW)

(73) Assignee: Ken Sean Factory Co., Ltd., Fu-Hsing Hsiang, Chang-Hua Hsien (TW)

( * ) Notice: Subject to any disclaimer, the term of this patent is extended or adjusted under 35 U.S.C. 154(b) by 0 days.

(21) Appl. No.: 12/321,826

(22) Filed: Jan. 26, 2009

(65) Prior Publication Data

US 2009/0225457 A1 Sep. 10, 2009

(30) Foreign Application Priority Data

Mar. 7, 2008 (TW) .............................. 97203890 U

(51) Int. Cl.
  G02B 5/10 (2006.01)
  B60R 1/04 (2006.01)
(52) U.S. Cl. ....................................... 359/868; 359/851
(58) Field of Classification Search ................. 359/851, 359/866, 868, 850, 854
  See application file for complete search history.

(56) References Cited

U.S. PATENT DOCUMENTS

| 1,872,905 | A | * | 8/1932 | Darling | 359/868 |
| 2,778,273 | A | * | 1/1957 | Fellmeth | 359/864 |
| 2,857,810 | A | * | 10/1958 | Troendle | 359/868 |
| 3,003,396 | A | * | 10/1961 | Jenkins | 359/868 |
| 4,258,979 | A | * | 3/1981 | Mahin | 359/868 |
| 4,264,144 | A | * | 4/1981 | McCord | 359/868 |
| 4,449,786 | A | * | 5/1984 | McCord | 359/868 |
| 4,730,914 | A | * | 3/1988 | Stout | 359/868 |
| 5,321,556 | A | * | 6/1994 | Joe | 359/863 |
| 5,621,569 | A | * | 4/1997 | Schlenke | 359/603 |
| 7,234,825 | B2 | * | 6/2007 | Meng | 359/864 |
| 7,517,100 | B2 | * | 4/2009 | Englander et al. | 359/868 |
| 2003/0169521 | A1 | * | 9/2003 | Hoegh | 359/864 |

FOREIGN PATENT DOCUMENTS

| JP | 55-051635 | * | 4/1980 |
| JP | 62-105103 | * | 5/1987 |

* cited by examiner

*Primary Examiner*—Ricky D Shafer
(74) *Attorney, Agent, or Firm*—Oshia • Liang LLP

(57) ABSTRACT

A rearview mirror device includes an elongated mirror body and a housing. The mirror body is formed with a first curved section having two opposite ends, and second and third curved sections extending integrally and respectively from the opposite ends of the first curved section. The first curved section has a radius of curvature larger than a radius of curvature of the second curved section and a radius of curvature of the third curved section. A ratio of the radius of curvature of the first curved section to the radius of curvature of either one of the second and third curved sections is not greater than 1.65. The housing includes a frame body with first and second mounting portions. Each of the second and third curved sections is mounted on a respective one of the first and second mounting portions of the frame body.

4 Claims, 5 Drawing Sheets

REARVIEW MIRROR DEVICE WITH WIDE VIEWING ANGLE

CROSS-REFERENCE TO RELATED APPLICATION

This application claims priority of Taiwanese application no. 097203890, filed on Mar. 7, 2008.

BACKGROUND OF THE INVENTION

1. Field of the Invention

The invention relates to a rearview mirror device, more particularly to a rearview mirror device with a wide viewing angle.

2. Description of the Related Art

FIG. 1 illustrates a conventional rearview mirror device that includes a primary mirror body 1 and a smaller auxiliary mirror body 2 mounted on the primary mirror body 1 to result in a relatively wide viewing angle. However, such an arrangement results in the image on the primary mirror body 1 being partly blocked by the auxiliary mirror body 2, and the different images on the primary mirror body 1 and the auxiliary mirror body 2 as seen by a driver can result in misjudgment which, in turn, can lead to accidents. Moreover, the auxiliary mirror body 2 is prone to fall off from the primary mirror body 1 after a period of use.

FIG. 2 illustrates another conventional rearview mirror device that has a flat main mirror surface 3 and a curved mirror surface 4 to result in a relatively wide viewing angle. However, the problem of driver misjudgment is still unresolved due to the apparent discontinuity in the images on the main mirror surface 3 and the curved mirror surface 4 as seen by the driver and attributed to the relatively large step present at the junction of the main mirror surface 3 and the curved mirror surface 4.

SUMMARY OF THE INVENTION

Therefore, an object of the present invention is to provide a rearview mirror device that can overcome the above drawbacks associated with the prior art.

Accordingly, the rearview mirror device of this invention includes an elongated mirror body and a housing. The mirror body is formed with a first curved section having two opposite ends, and second and third curved sections extending integrally and respectively from the opposite ends of the first curved section. The first curved section has a radius of curvature larger than a radius of curvature of the second curved section and a radius of curvature of the third curved section. A ratio of the radius of curvature of the first curved section to the radius of curvature of either one of the second and third curved sections is not greater than 1.65. The housing includes a frame body with first and second mounting portions. Each of the second and third curved sections is mounted on a respective one of the first and second mounting portions of the frame body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
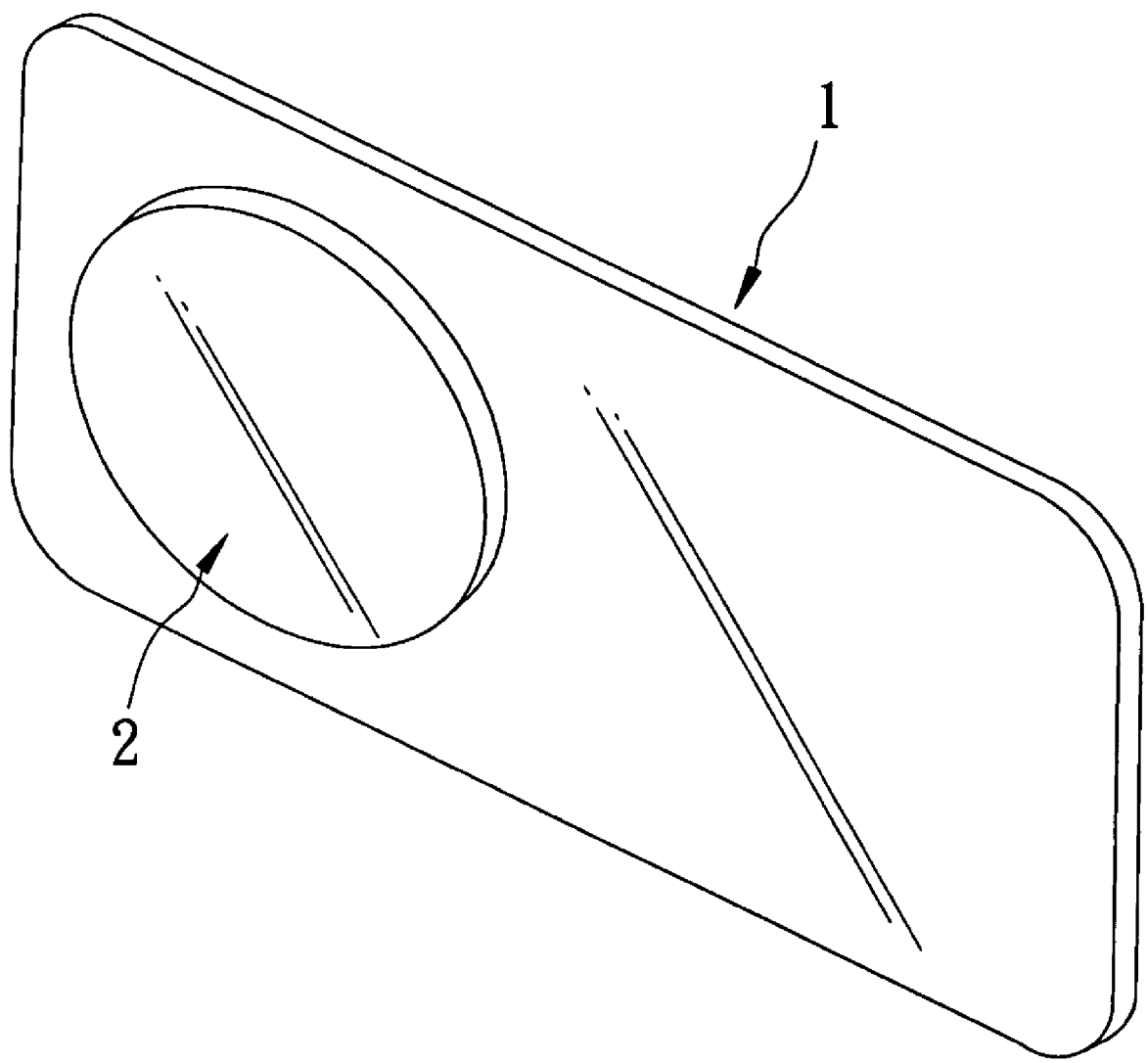
FIG. 1 is a perspective view of a conventional rearview mirror device.
Figure 2:
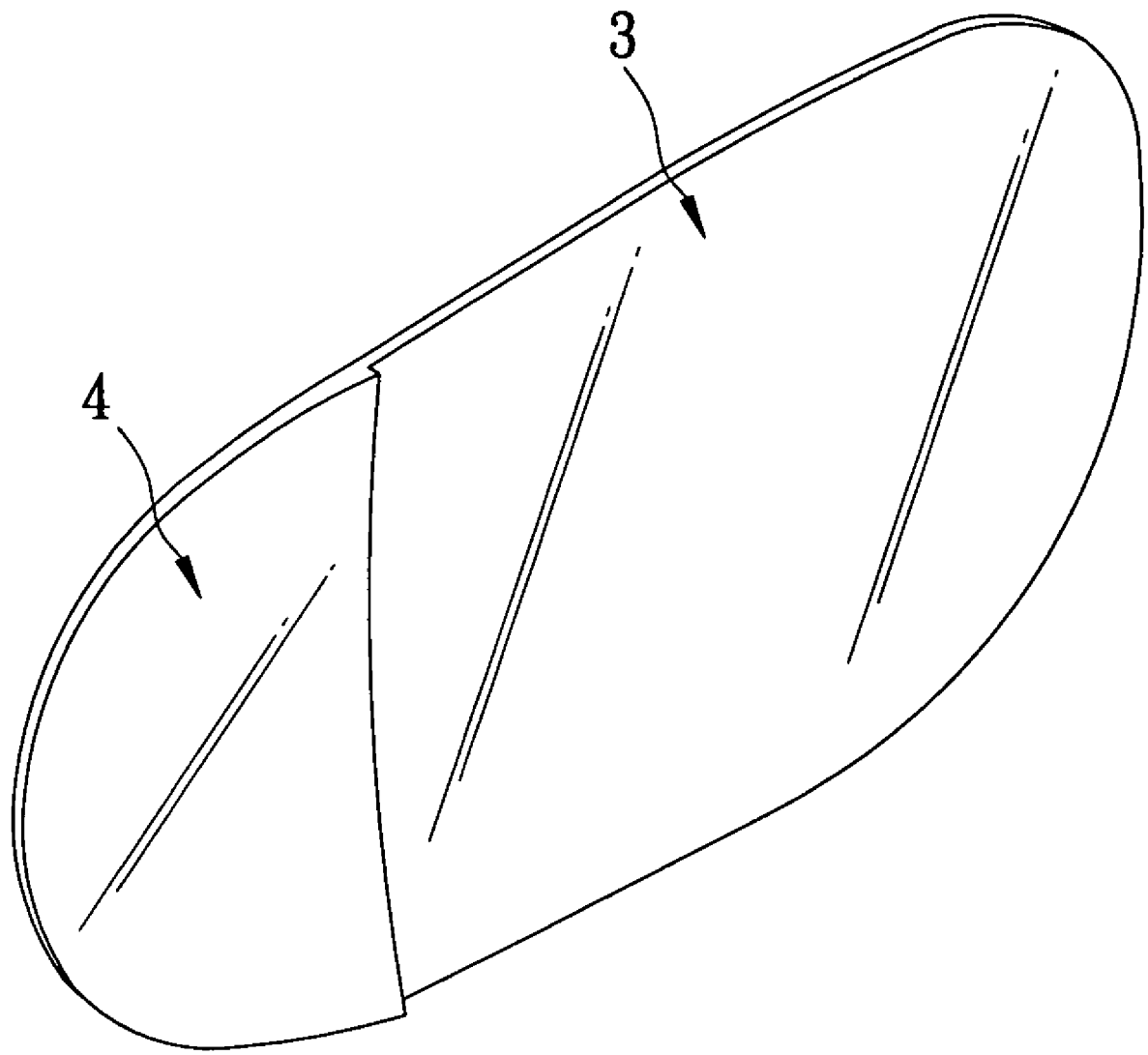
FIG. 2 is a perspective view of another conventional rearview mirror device.
Figure 3:
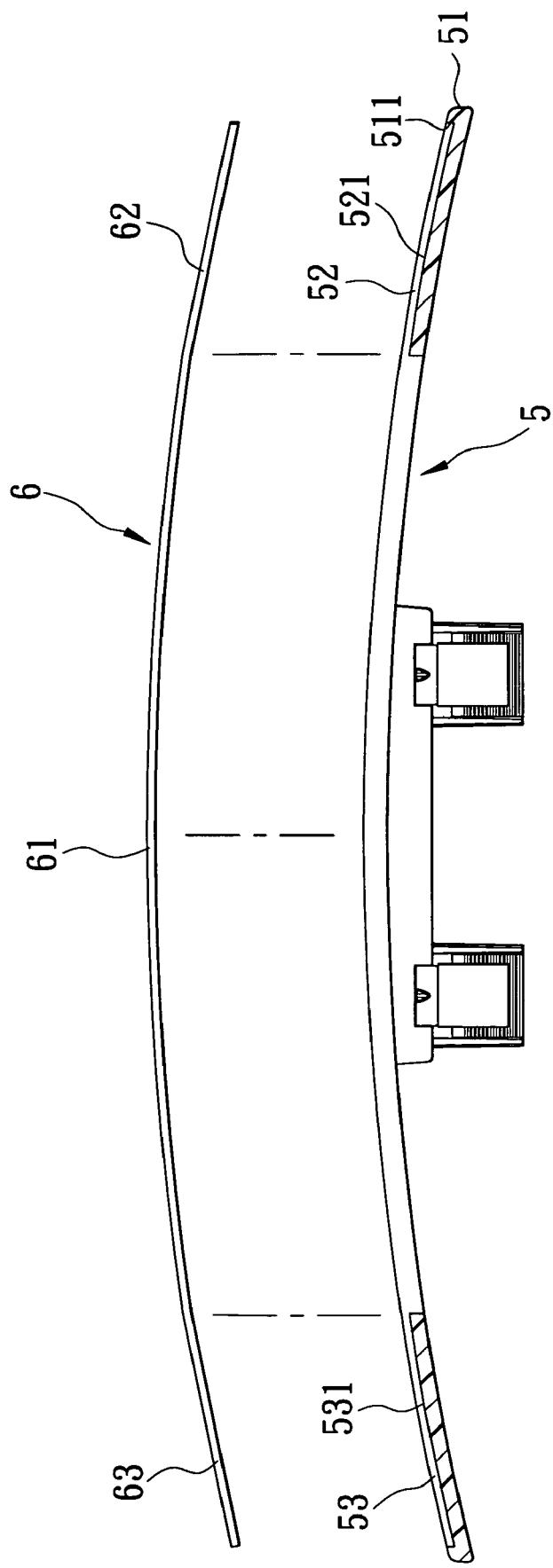
FIG. 3 is an exploded schematic partly sectional view of a preferred embodiment of a rearview mirror device according to the present invention.
Figure 4:
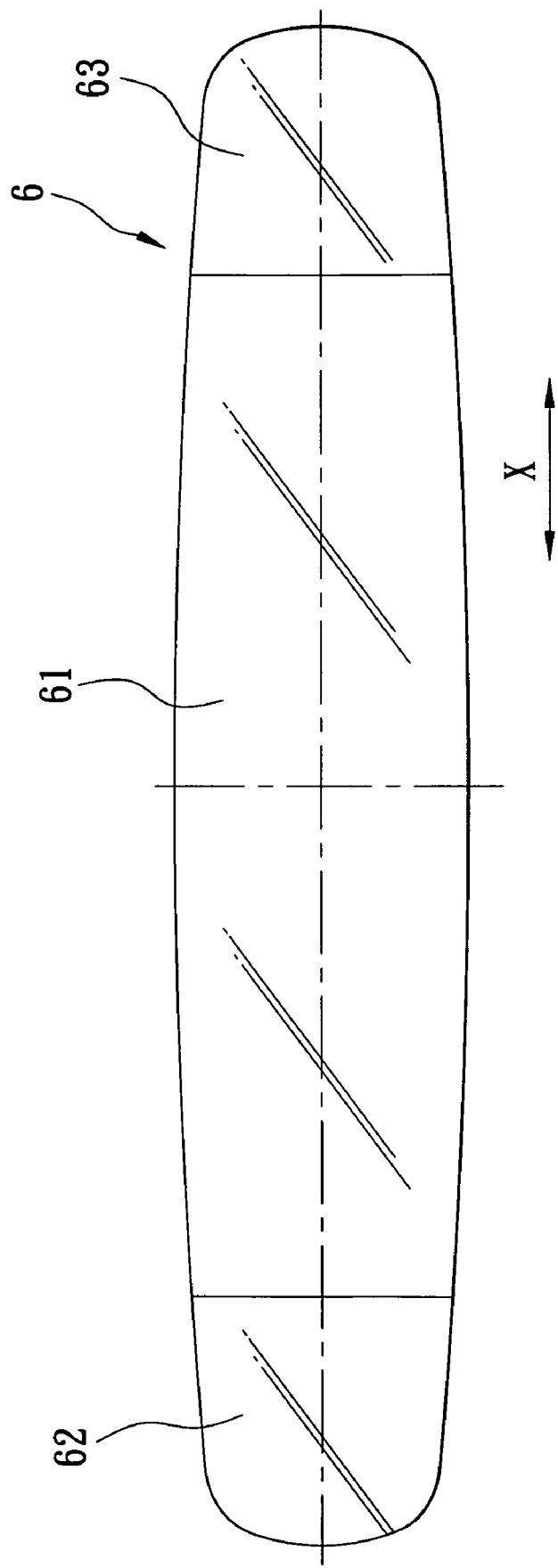
FIG. 4 is a schematic view of a mirror body of the preferred embodiment.
Figure 5:
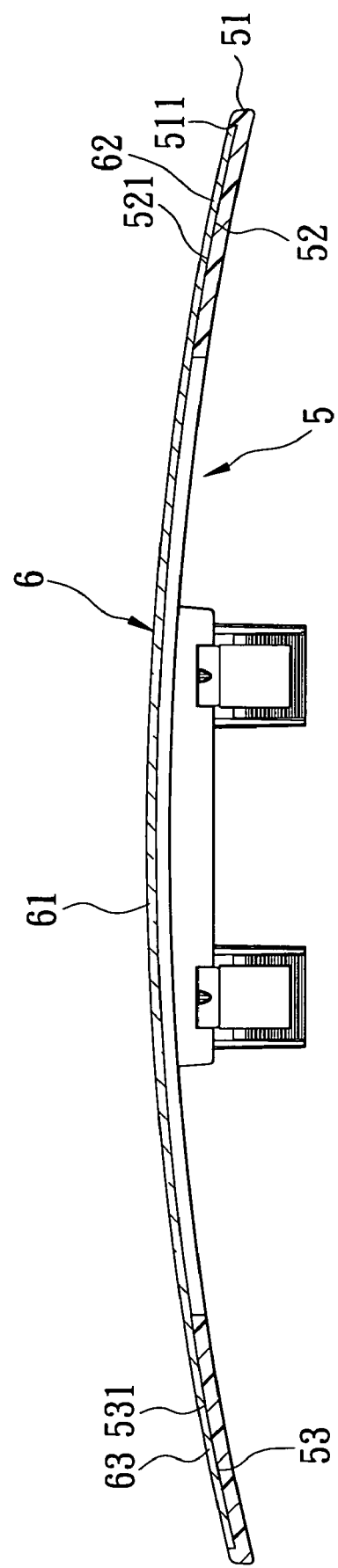
FIG. 5 is an assembled schematic sectional view of the preferred embodiment.

Referring to FIGS. 3 to 5, the preferred embodiment of a rearview mirror device according to the present invention is shown to comprise an elongated mirror body 6 and a housing 5.

The mirror body 6 is formed with a first curved section 61 having two opposite ends, and second and third curved sections 62, 63 extending integrally and respectively from the opposite ends of the first curved section 61. The first curved section 61 has a radius of curvature larger than a radius of curvature of the second curved section 62 and a radius of curvature of the third curved section 63. A ratio of the radius of curvature of the first curved section 61 to the radius of curvature of either one of the second and third curved sections 62, 63 is not greater than 1.65. Accordingly, the mirror body 6 is configured with a continuous smooth surface constituted by the curved sections 61, 62, 63 with varying radii of curvature to result in a wide viewing angle with a continuous view to minimize the possibility of driver misjudgment. In this embodiment, the radius of curvature of the second curved section 62 is substantially equal to the radius of curvature of the third curved section 63. The first curved section 61 has a length measured along a longitudinal axis (X) and ranging from 190 mm to 250 mm, and each of the second and third curved sections 62, 63 has a length measured along the longitudinal axis (X) and ranging from 40 mm to 65 mm. The radius of curvature of the first curved section 61 ranges from 700 mm to 900 mm, and the radius of curvature of each of the second and third curved sections 62, 63 ranges from 550 mm to 650 mm. In this embodiment, the radius of curvature of the first curved section 61 is 800 mm, whereas the radius of curvature of each of the second and third curved sections 62, 63 is 600 mm.

The housing 5 includes a frame body 51 with first and second mounting portions 52, 53 disposed on an inner ring surface 511 of the frame body 51. Each of the first and second mounting portions 52, 53 of the frame body 51 has an abutment side 521, 531 with a radius of curvature substantially the same as the radius of curvature of a respective one of the second and third curved sections 62, 63. Each of the second and third curved sections 62, 63 is mounted securely on the respective one of the first and second mounting portions 52, 53 of the frame body 51.

In use, a driver observes the image on the first curved section 61 when driving on one lane. When the driver intends to make a turn or to change lanes, the images on the second and third curved sections 62, 63 provide a sufficiently wide view to assist the driver in determining actual road conditions. Since the curved sections 61, 62, 63 are integrally formed, and the ratio of the radius of curvature of the first curved section 61 to the radius of curvature of either one of the second and third curved sections 62, 63 is suitably controlled, apparent discontinuities in the images on the curved sections 61, 62, 63 as seen by the driver can be avoided. Therefore, a wide viewing angle without the drawbacks of the prior art is made possible when the rearview mirror device of this invention is in use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rearview mirror device comprising:
an elongated mirror body consisting of a first curved section having two opposite ends, and second and third curved sections extending integrally and respectively from said opposite ends of said first curved section, said first curved section having a radius of curvature larger than a radius of curvature of said second curved section and a radius of curvature of said third curved section, a ratio of the radius of curvature of said first curved section to the radius of curvature of either one of said second and third curved sections being not greater than 1.65; and
a housing including a frame body with first and second mounting portions, each of said second and third curved sections being mounted on a respective one of said first and second mounting portions of said frame body;
wherein said first curved section has a length measured along a longitudinal axis and ranging from 190 mm to 250 mm, and each of said second and third curved sections has a length measured along the longitudinal axis and ranging from 40 mm to 65 mm.

2. The rearview mirror device as claimed in claim 1, wherein the radius of curvature of said second curved section is substantially equal to the radius of curvature of said third curved section.

3. The rearview mirror device as claimed in claim 1, wherein the radius of curvature of said first curved section ranges from 700 mm to 900 mm, and the radius of curvature of each of said second and third curved sections ranges from 550 mm to 650 mm.

4. The rearview mirror device as claimed in claim 1, wherein each of said first and second mounting portions of said frame body has an abutment side with a radius of curvature substantially the same as the radius of curvature of the respective one of said second and third curved sections.

* * * * *